(12) United States Patent
Morino et al.

(10) Patent No.: US 11,214,295 B2
(45) Date of Patent: Jan. 4, 2022

(54) STEERING CONTROL SYSTEM

(71) Applicants: TOYOTA JIDOSHA KABUSHIKI KAISHA, Toyota (JP); PACIFIC INDUSTRIAL CO., LTD., Gifu (JP)

(72) Inventors: Tetsuya Morino, Susono (JP); Toshiya Furukura, Susono (JP); Yoshio Kudo, Machida (JP)

(73) Assignees: TOYOTA JIDOSHA KABUSHIKI KAISHA, Toyota (JP); PACIFIC INDUSTRIAL CO., LTD., Gifu (JP)

( * ) Notice: Subject to any disclaimer, the term of this patent is extended or adjusted under 35 U.S.C. 154(b) by 116 days.

(21) Appl. No.: 16/828,238

(22) Filed: Mar. 24, 2020

(65) Prior Publication Data

US 2020/0307674 A1    Oct. 1, 2020

(30) Foreign Application Priority Data

Mar. 25, 2019 (JP) .............................. JP2019-057056

(51) Int. Cl.
*B62D 5/00* (2006.01)
*B62D 6/02* (2006.01)
(Continued)

(52) U.S. Cl.
CPC ........... *B62D 5/005* (2013.01); *B62D 5/0463* (2013.01); *B62D 5/0466* (2013.01); *B62D 6/002* (2013.01); *B62D 6/02* (2013.01); *B62D 15/021* (2013.01)

(58) Field of Classification Search
CPC ........ B62D 5/00; B62D 5/005; B62D 5/0464; B62D 5/0463; B62D 5/0466; B62D 6/02; B62D 6/002; B62D 15/021
See application file for complete search history.

(56) References Cited

U.S. PATENT DOCUMENTS

2015/0274206 A1* 10/2015 Takeda ................. B62D 5/0463
701/41
2015/0336606 A1* 11/2015 Shibuya ................. B62D 5/001
180/444
(Continued)

FOREIGN PATENT DOCUMENTS

JP       2015-123864 A       7/2015
JP       2018-047784 A       3/2018

*Primary Examiner* — Tan Q Nguyen
(74) *Attorney, Agent, or Firm* — Sughrue Mion, PLLC (57) ABSTRACT

A steering control system includes a steering-motor for turning wheels, a reaction-force-motor for applying a reaction torque to a steering of the vehicle, and a controller. The controller calculates a turning angle based on a first-characteristic representing a relationship of the turning angle to a steering angle, and calculates a reaction torque based on a second-characteristic representing a relationship of a reaction torque to the steering angle. The controller changes the first-characteristic from a characteristic corresponding to a first-state to a characteristic corresponding to a second-state in response to a change in the state of the vehicle from the first-state to the second-state. The controller maintains the second-characteristic at the characteristic corresponding to the first-state when the state of the vehicle changes from the first-state to the second-state in the case where the steering angle is steered to a steering limit corresponding to an upper limit of the turning angle.

7 Claims, 7 Drawing Sheets

(51) Int. Cl.
  *B62D 15/02* (2006.01)
  *B62D 5/04* (2006.01)
  *B62D 6/00* (2006.01)

(56) References Cited

U.S. PATENT DOCUMENTS

2017/0341679 A1* 11/2017 Ikegaya .................. B62D 6/02
2018/0079448 A1   3/2018 Kodera
2018/0362073 A1* 12/2018 Hirate .................... B62D 6/002

\* cited by examiner

STEERING CONTROL SYSTEM

CROSS-REFERENCE TO RELATED APPLICATION

The present application is based on, and claims priority from, Japanese Patent Application Serial Number 2019-057056, filed on Mar. 25, 2019, the disclosure of which is hereby incorporated by reference herein in its entirety.

BACKGROUND

Field

The present disclosure relates to a steering control system, and more particularly, to a steering control system for a steer-by-wire vehicle.

Background Art

Japanese Patent Application Laid-Open No. 2018-047784 discloses a technique relating to a steering control apparatus for performing processing for avoiding that a steering operated so that a steering angle exceeds an upper limit value. In this technique, when the magnitude of the maximum value of the turning angle of the wheel or the steering angle of the steering becomes equal to or larger than the limit start threshold value, the reaction force actuator is operated to rapidly increase the limiting reaction force for limiting further increase in the magnitude of the steering angle.

Further, Japanese Patent Application Publication No. 2015-123864 discloses a technique relating to a steering control apparatus capable of adjustment a steering angle ratio characteristic representing a relationship between a steering angle of a steering wheel and a turning angle of turning wheels. In this technique, at least two characteristics are set as the steering angle ratio characteristic, i.e., the steering angle ratio characteristic at the time of driving and the steering angle characteristic at the time of stopping.

SUMMARY

In a configuration in which the steering angle ratio characteristic is adjusted in accordance with a change in the state of the vehicle, as in the technique of Japanese Patent Laid-Open No. 2015-123864, it is possible to optimize the steering angle ratio characteristic in accordance with the state of the vehicle. However, when the steering angle ratio characteristic changes, a steering limit of the steering corresponding to the turning limit at which the turning angle becomes the maximum changes. Therefore, as in the art of Japanese Patent Application Laid-Open No. 2018-047784, when applying the technology of JP-2015-123864 in the configuration of rapidly increasing the anti-torque at the steering limit, the opposite torque suddenly changes when the state of the vehicle being steered at the steering limit changes, the driver may perceive an unexpected steering feeling. As described above, in steering control of a steer-by-wire vehicle in which the steering angle ratio characteristic can be adjusted according to the state of the vehicle, there is a problem in controlling the reaction torque when the state of the vehicle changes at the steering limit.

The present disclosure has been made in view of the above-mentioned problems, and an object thereof is to provide a steering control system capable of suppressing a sudden change in reaction torque when a steering angle of a steer-by-wire vehicle is steered to a steering limit.

In order to solve the above problems, the first disclosure is applied to a steering control system for a steer-by-wire vehicle. The steering control system includes a steering motor for turning wheels of the vehicle, a reaction force motor for applying a reaction torque to a steering of the vehicle, and a controller for calculating a turning angle of the wheels for controlling the steering motor and a reaction torque for controlling the reaction force motor based on a state of the vehicle. The controller is configured to calculate the turning angle according to the steering angle based on a first characteristic representing a relationship of a magnitude of the turning angle to the steering angle of the steering, and calculate the reaction torque according to the steering angle based on a second characteristic representing a relationship of a magnitude of the reaction torque to the steering angle. The first characteristic and the second characteristic are configured to be adjustable according to the state of the vehicle. The controller is configured to change the first characteristic from a characteristic corresponding to a first state to a characteristic corresponding to a second state in response to a change in the state of the vehicle from the first state to the second state. The controller is configured to maintain the second characteristic at the characteristic corresponding to the first state when the state of the vehicle changes from the first state to the second state in the case where the steering angle is steered to a steering limit corresponding to an upper limit of the turning angle.

The second disclosure has the following further features in the first disclosure.

The controller is configured to, when the steering angle is returned to a predetermined steering angle in a third state after the state of the vehicle is changed from the first state to the second state at the steering limit, change the second characteristic from the characteristic corresponding to the first state to the characteristic corresponding to the third state.

In order to solve the above-mentioned problems, the third disclosure is applied to a steering control system for a steer-by-wire vehicle. The steering control system includes a steering motor for turning wheels of the vehicle, a reaction force motor for applying a reaction torque to a steering of the vehicle, and a controller for calculating a turning angle of the wheels for controlling the steering motor and a reaction torque for controlling the reaction force motor based on a state of the vehicle. The controller is configured to calculate the turning angle according to the steering angle based on a first characteristic representing a relationship of a magnitude of the turning angle to the steering angle of the steering, and calculate the reaction torque according to the steering angle based on a second characteristic representing a relationship of a magnitude of the reaction torque to the steering angle. The first characteristic and the second characteristic are configured to be adjustable according to the state of the vehicle. The controller is configured to change the first characteristic from a characteristic corresponding to a first state to a characteristic corresponding to a second state in response to a change in the state of the vehicle from the first state to the second state. The controller is configured to, when the steering angle is steered to a steering limit corresponding to an upper limit of the turning angle and the state of the vehicle changes from the first state to the second state, change the second characteristic from the characteristic corresponding to the first state to the characteristic corresponding to the second state at a change speed slower than a change speed of the state of the vehicle.

The forth disclosure has the following further features in any one of the first to third disclosures.

The state of the vehicle includes a vehicle speed. The second state has a higher vehicle speed than the first state. When the state of the vehicle changes from the first state to the second state at the steering limit, the controller is configured to change the first characteristic so that the magnitude of the turning angle with respect to the steering angle decreases.

The fifth disclosure has the following further features in any one of the first to third disclosures.

The state of the vehicle includes a vehicle speed. The second state has a lower vehicle speed than the first state. When the state of the vehicle changes from the first state to the second state at the steering limit, the controller is configured to change the first characteristic so that the magnitude of the turning angle with respect to the steering angle increases.

According to the steering control system of the first disclosure, even when the state of the vehicle changes from the first state to the second state and the first characteristic changes at the steering limit, the second characteristic is maintained as the characteristic corresponding to the first state. As a result, since the reaction torque can be maintained even when the steering limit changes, it is possible to suppress a sudden change in the steering angle of the steering and to solve the driver's discomfort.

According to the steering control system of the second disclosure, when the steering angle is returned to the prescribed steering angle in the third state after the state of the vehicle is changed from the first state to the second state in the steering limit, the second characteristic is changed from the characteristic corresponding to the first state to the characteristic corresponding to the third state. The second characteristic is that the smaller the steering angle, the smaller the difference in the reaction torque corresponding to the state of the vehicle. Therefore, according to the present disclosure, it is possible to make the second characteristic follow the characteristic corresponding to the state of the vehicle while suppressing the sudden change of the reaction torque.

According to the steering control system of the third disclosure, even when the state of the vehicle changes from the first state to the second state and the first characteristic changes at the steering limit, the second characteristic changes from the characteristic corresponding to the first state to the characteristic corresponding to the second state at the change speed slower than the change speed from the first state to the second state. As a result, even when the state of the vehicle changes and the steering limit changes, the variation of the reaction torque accompanying the change becomes slow, so that the driver may turn or turn back of the steering without any sense of discomfort.

According to the fourth disclosure, it is possible to suppress further turning of the steering angle of the steering when the vehicle accelerates at the steering limit.

According to the fifth disclosure, when the vehicle decelerates at the steering limit, it is possible to suppress the steering angle of the steering from being suddenly turned back.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

1. First Embodiment 1-1. Steering Control System

Figure 1:
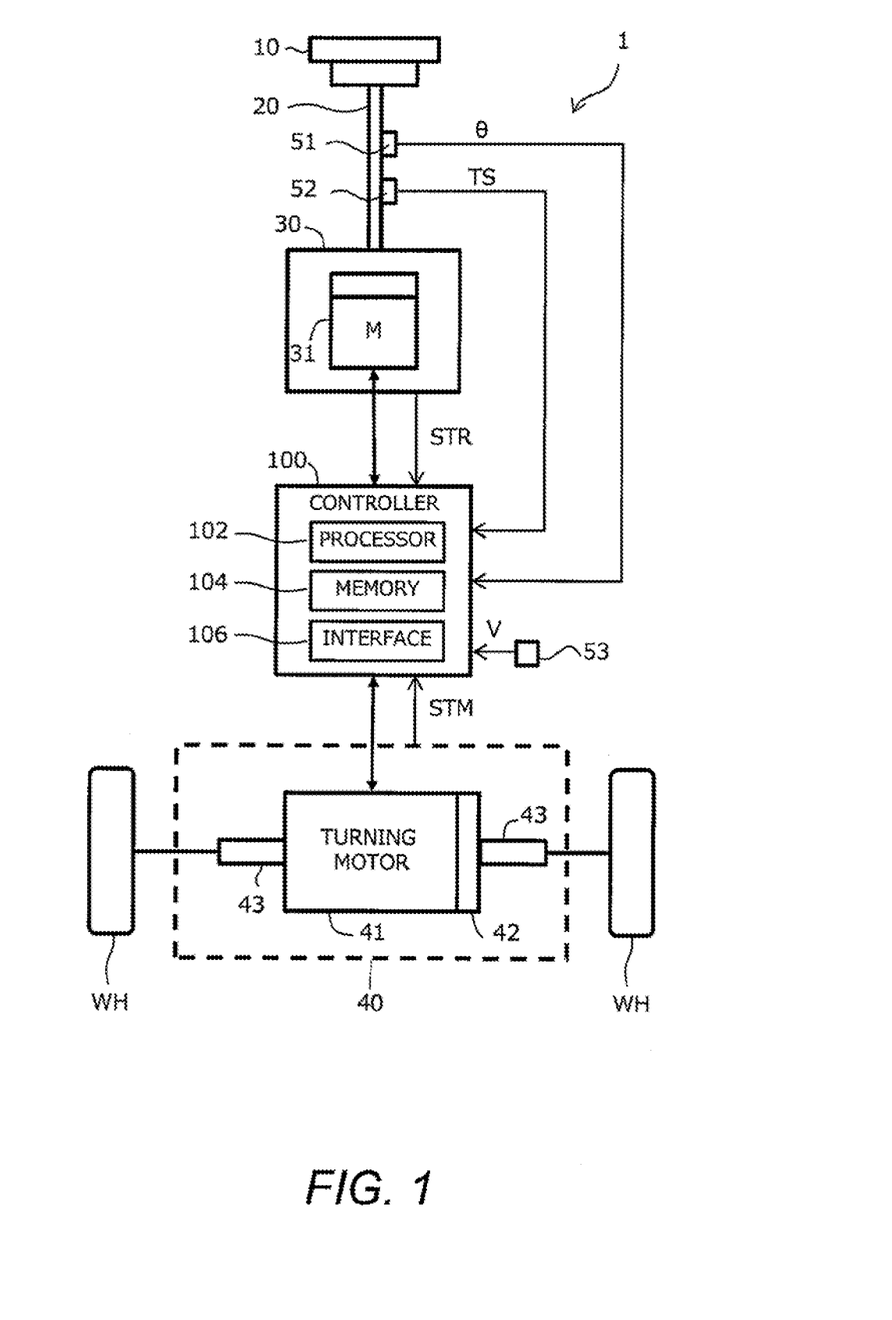
FIG. 1 is a block diagram schematically showing a configuration example of a steering control system according to a first embodiment.

FIG. 1 is a block diagram schematically showing a configuration example of a steering control system according to the present embodiment. The steering control system 1 is mounted on a vehicle, and turns wheels WH of the vehicle by a steer-by-wire system. That is, the steering control system 1 realizes a steer-by-wire vehicle.

In the example shown in FIG. 1, the steering control system 1 includes a steering wheel 10, a steering shaft 20, a reaction force generating device 30, a turning device 40, a group of sensors 51 to 53, and a controller 100.

The steering wheel 10 is an operating member used by a driver for steering. The steering wheel 10 is also called a "steering 10". The steering shaft 20 is connected to the steering wheel 10 and rotates together with the steering wheel 10.

The reaction force generating device 30 applies a reaction torque TR to the steering wheel 10 by operation of a reaction force motor 31. The reaction force generating device 30 sends reaction force motor state information STR indicating the state of the reaction force motor 31 to the controller 100. For example, the reaction force motor state information STR indicates a drive voltage, a drive current, a rotation angle, a rotation speed, a temperature, and the like of the reaction force motor 31.

The turning device 40 turns the wheels WH. Specifically, the turning device 40 includes a turning motor 41, a reduction gear 42, and a turning shaft 43. The rotor of the turning motor 41 is connected to the turning shaft 43 via the reduction gear 42. The turning shaft 43 is connected to the wheels WH. When the turning motor 41 rotates, its rotational motion is converted into linear motion of the turning shaft 43, whereby the wheels WH are turned. That is, the wheels WH may be turned by the operation of the turning motor 41. The operation of the turning motor 41 is controlled by the controller 100.

The turning device 40 sends turning motor state information STM indicating the state of the turning motor 41 to the controller 100. For example, the turning motor state information STM indicates a driving voltage, a driving current, a rotation angle, a rotation speed, a temperature, and the like of the turning motor 41.

The turning device 40 is mechanically separated from the steering wheel 10 and the reaction force generating device 30 on the steering side.

The steering angle sensor 51 detects a steering angle $\theta$ which is a rotation angle of the steering wheel 10. The steering angle sensor 51 sends information on the detected steering angle $\theta$ to the controller 100.

The steering torque sensor 52 detects a steering torque TS applied to the steering shaft 20. The steering torque sensor 52 sends information on the detected steering torque TS to the controller 100.

The vehicle speed sensor 53 detects a vehicle speed V, which is the speed of the vehicle. The vehicle speed sensor 53 sends information on the detected vehicle speed V to the controller 100. Alternatively, a wheel speed sensor may be used instead of the vehicle speed sensor 53, and the vehicle speed V may be calculated from the rotational speed of each wheel.

The controller 100 controls the steering control system according to the present embodiment. The controller 100 includes a microcomputer having a processor 102, a memory 104, and an input-output interface 106. This microcomputer is also called an ECU (Electronic Control Unit). The processor 102 executes the control program stored in the memory 104, thereby executing processing by the controller 100.

1-2. Configuration of Controller

Figure 2:
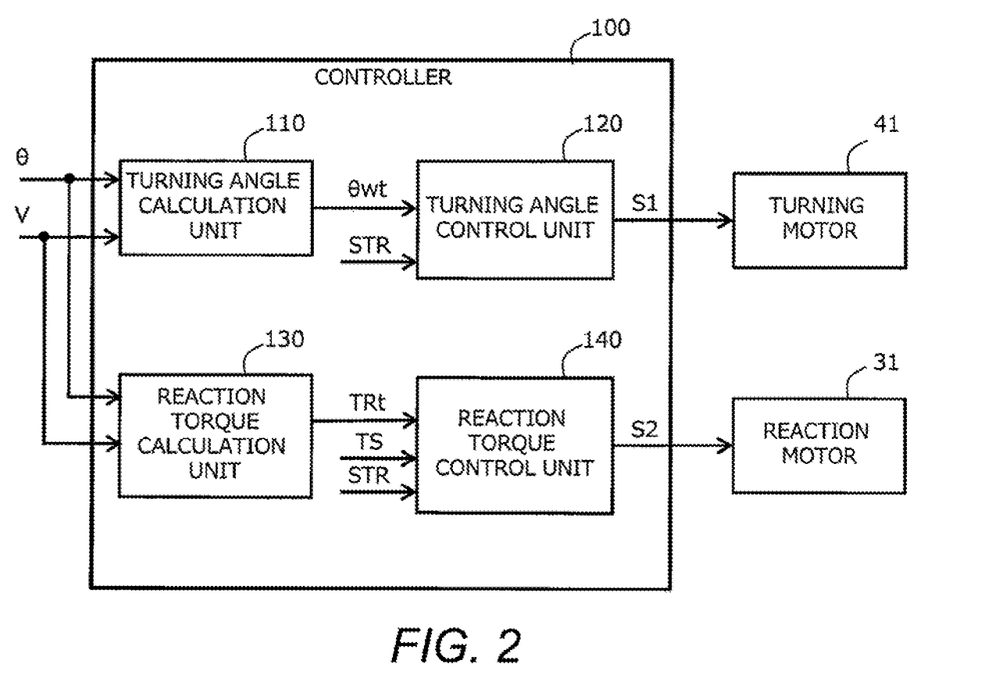
FIG. 2 is a block diagram for explaining a function of a controller.

FIG. 2 is a block diagram for explaining the function of the controller. The controller 100 controls the turning of the wheels WH by controlling the turning motor 41 in accordance with the rotation of the steering wheel 10. This control is also called "turning angle control". The controller 100 controls the reaction torque TR applied to the steering wheel 10 by controlling the reaction force motor 31 in accordance with the rotation of the steering wheel 10. This control is also referred to as "reaction torque control". The controller 100 includes a turning angle calculation unit 110, a turning angle control unit 120, a reaction torque calculation unit 130, and a reaction torque control unit 140 as functional blocks for realizing the turning angle control and the reaction torque control.

Figure 3:
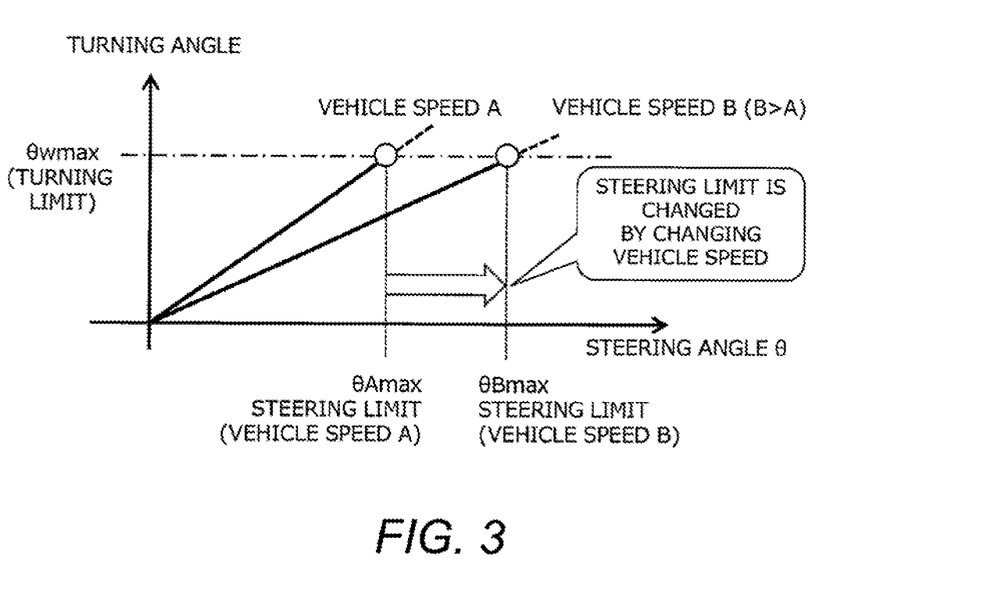
FIG. 3 is a diagram showing an example of a first characteristic stored in the controller.

The turning angle calculation unit 110 receives inputs of the steering angle $\theta$ and the vehicle speed V, and outputs a target turning angle $\theta$wt. The turning angle calculation unit 110 stores, for each state of the vehicle, first characteristic indicating a relationship between the turning angle $\theta$w and the steering angle $\theta$. The state of the vehicle here is, for example, the vehicle speed V. FIG. 3 is a diagram showing an example of the first characteristic stored in the controller. In this drawing, the characteristic at the time of the vehicle speed A and the characteristic at the time of the vehicle speed B larger than the vehicle speed A are exemplified. As shown in FIG. 3, the first characteristic is related such that the larger the vehicle speed V, the smaller the magnitude of the steering angle $\theta$w with respect to the steering angle $\theta$. That is, the first characteristic is configured to be adjustable in accordance with the vehicle speed V as the state of the vehicle. According to such a first characteristic, as the vehicle speed V increases, the steering angle (i.e., steering limit) $\theta$max corresponding to the turning limit $\theta$wmax at which the turning angle $\theta$w becomes the maximum (i.e., upper limit) is set to a larger angle. That is, the steering angle (i.e., steering limit) $\theta$Bmax corresponding to the turning limit $\theta$wmax at the vehicle speed B is set to be larger than the steering angle (i.e., steering limit) $\theta$Amax corresponding to the turning limit $\theta$wmax at the vehicle speed A. The turning angle calculation unit 110 calculates a turning angle $\theta$w corresponding to the input steering angle $\theta$ and the vehicle speed V from the first characteristic, and outputs the calculated turning angle $\theta$w as a target turning angle $\theta$wt. The calculated target turning angle $\theta$wt is output to the turning angle control unit 120.

The turning angle control unit 120 controls the turning motor 41 so that the turning angle of the wheels WH becomes the target turning angle $\theta$wt. More specifically, the turning angle control unit 120 generates a current control signal S1 for driving the turning motor 41 based on the rotation angle of the turning motor 41 and the target turning angle $\theta$wt. The turning motor 41 is driven in accordance with the current control signal S1, and the wheels WH is turned by the rotation of the turning motor 41.

Figure 4:
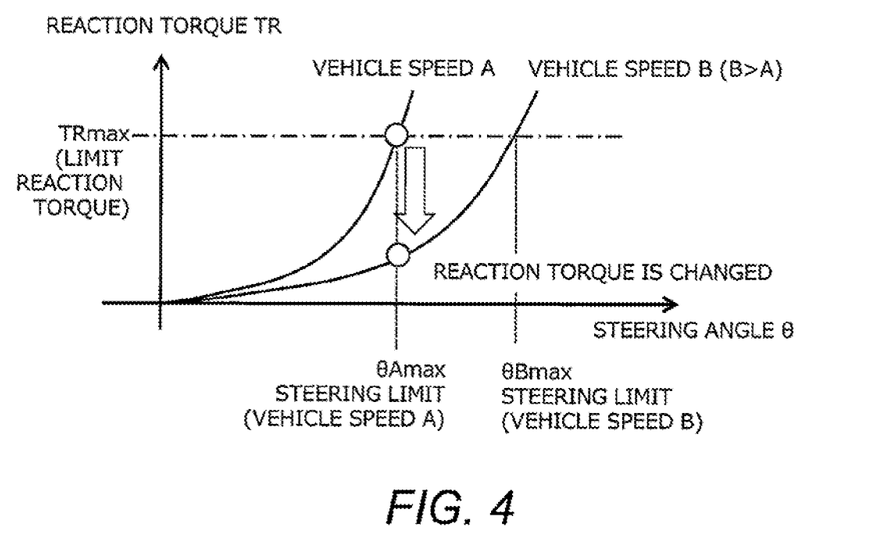
FIG. 4 is a diagram showing an example of a second characteristic stored in the controller.

The reaction torque calculation unit 130 receives inputs of the steering angle $\theta$ and the vehicle speed V, and outputs a target reaction torque TRt. The reaction torque calculation unit 130 stores the second characteristic representing the relationship between the magnitude of the reaction torque TR and the steering angle $\theta$ for each state of the vehicle. The state of the vehicle is, for example, the vehicle speed V. FIG. 4 is a diagram showing an example of the second characteristic stored in the controller. In this drawing, the characteristic at the time of the vehicle speed A and the characteristic at the time of the vehicle speed B larger than the vehicle speed A are exemplified. As shown in FIG. 4, the second characteristic is related such that the larger the vehicle speed, the smaller the magnitude of the reaction torque TR with respect to the steering angle $\theta$. That is, the second characteristic is configured to be adjustable in accordance with the vehicle speed V as the state of the vehicle. According to such a second characteristic, as the vehicle speed increases, the steering limit $\theta$max that generates the limit reaction force TRmax, which is the reaction force corresponding to the turning limit $\theta$wmax, is set to a larger angle. That is, the steering limit $\theta$Bmax corresponding to the limit reaction force TRmax at the vehicle speed B is set to be larger than the steering limit $\theta$Amax corresponding to the limit reaction force TRmax at the vehicle speed A. The reaction torque calculation unit 130 calculates a reaction torque TR corresponding to the input steering angle $\theta$ and vehicle speed V from the second characteristic, and outputs the calculated reaction torque TR as a target reaction torque TRt. The calculated target reaction torque TRt is output to the reaction torque control unit 140.

The reaction torque control unit 140 controls the reaction force motor 31 so that the target reaction torque TRt is generated. More specifically, the reaction torque control unit 140 generates a current control signal S2 for driving the reaction force motor 31 based on the calculated target reaction torque TRt, the rotation angle of the reaction force motor 31, the steering torque TS, and the like. The reaction force motor 31 is driven in accordance with the current control signal S2, thereby generating a reaction torque TR.

The controller 100 may separately include a first controller including the turning angle calculation unit 110 and the turning angle control unit 120 for realizing steering angle control, and a second controller including a reaction torque calculation unit 130 and a reaction torque control unit 140 for realizing reaction torque control. In this case, the first controller and the second controller are communicably connected to each other and exchange necessary information with each other.

1-3. Reaction Torque Adjustment Process

Figure 5:
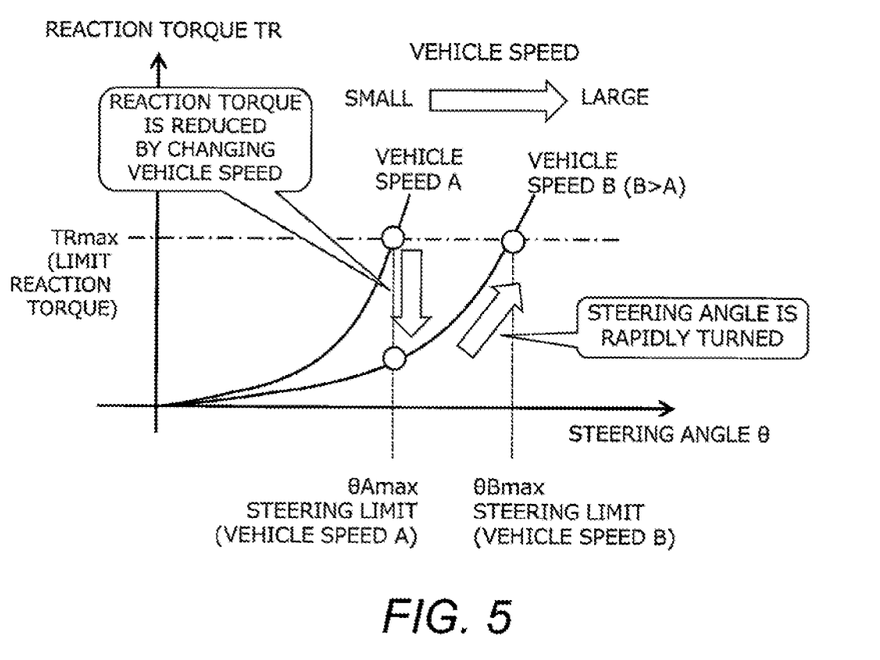
FIG. 5 is a diagram for explaining a problem of a reaction torque control.

When the reaction torque control described above is executed together with the turning angle control, the following problems occur. FIG. 5 is a diagram for explaining the problem of the reaction torque control. As shown in FIG. 5, a case is considered in which the vehicle is steered to the steering limit $\theta$Amax at the vehicle speed A. In this case, when the state of the vehicle changes from the vehicle speed A as the first state to the vehicle speed B (vehicle speed B>vehicle speed A) as the second state, the first characteristic in the turning angle control changes in response to the change in the vehicle speed, thereby increasing the steering angle corresponding to the steering limit. Further, when the state of the vehicle changes from the vehicle speed A to the vehicle speed B, the reaction force corresponding to the steering angle $\theta$Amax is reduced by changing the second characteristic in the reaction torque control. As a result, there is a problem that the steering wheel 10 rapidly turns to a new steering limit $\theta$Bmax, and the driver feels uncomfortable. Incidentally, such a problem that the reaction torque suddenly changes at the steering limit may occur not only when the vehicle speed rises but also when the vehicle speed falls.

Therefore, the steering control system 1 of the present embodiment executes the "reaction torque adjustment process" for adjusting the magnitude of the reaction torque as necessary. The reaction torque adjustment process is a process for suppressing a sudden change in the steering angle which is not intended by the driver. For example, when the vehicle speed changes while the steering wheel 10 of the vehicle is being steered to the steering limit, a reaction torque adjustment process is executed to suppress a sudden change in the steering angle.

Figure 6:
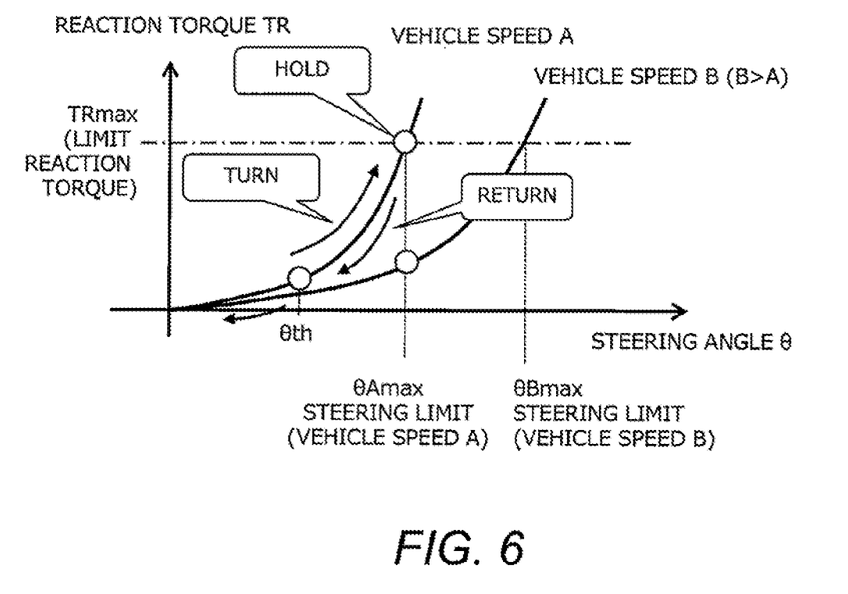
FIG. 6 is a diagram for explaining a reaction torque adjustment process.
Figure 7:
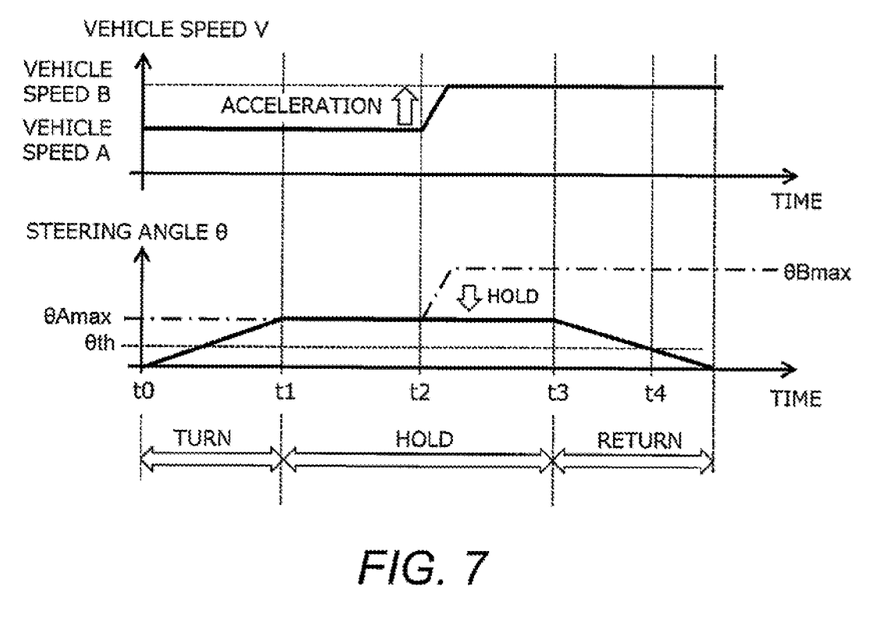
FIG. 7 is a time chart showing changes in a vehicle speed and a steering angle in the reaction torque adjustment process.

FIG. 6 is a diagram for explaining the reaction torque adjustment process. FIG. 7 is a time chart showing changes in the vehicle speed and the steering angle in the reaction torque adjustment process. The reaction torque adjustment process is executed in the reaction torque calculation unit 130 of the controller 100. In the example shown in FIGS. 6 and 7, the vehicle traveling at the vehicle speed A as the first state is accelerated at the time t2, and then travels at the vehicle speed B as the second state. First, when the steering of the steering wheel 10 is started at time t0, the steering is turned to the steering limit $\theta$Amax at the vehicle speed A at time t1, and thereafter, the steering is held until time t2. During the period from time t0 to time t2, the reaction torque calculation unit 130 calculates the reaction torque TR corresponding to the input steering angle $\theta$ using the second characteristic corresponding to the vehicle speed A.

On the other hand, when the vehicle speed changes from the vehicle speed A to the vehicle speed B in a condition where the steering angle $\theta$ is steered to the steering limit $\theta$Amax at the time t2, the reaction torque calculation unit 130 maintains the characteristic corresponding to the vehicle speed A without switching the subsequent second characteristic to the characteristic corresponding to the vehicle speed B. Thus, even when the steering limit changes from $\theta$Amax to $\theta$Bmax due to a change in the vehicle speed, the steering angle $\theta$ is held at the steering angle $\theta$Amax corresponding to the vehicle speed A. As a result, the turning of the steering wheel 10 due to a sudden change in the reaction torque can be suppressed, and a sense of discomfort of the driver may be reduced.

Thereafter, when the steering wheel 10 is turned back by the driver at the time t3, the reaction torque decreases accordingly. Here, the reaction torque calculation unit 130 continuously uses the second characteristic corresponding to the vehicle speed A to calculate the reaction torque TR corresponding to the input steering angle $\theta$.

Here, in the second characteristic, the smaller the steering angle, the smaller the difference in the reaction torque due to the difference in the vehicle speed. Therefore, in response to the steering angle $\theta$ being turned back to the prescribed steering angle $\theta$th at time t4, the reaction torque calculation unit 130 switches the second characteristic to the characteristic corresponding to the state (third state) of the vehicle at that time (here, the characteristic corresponding to the vehicle speed B). Here, the prescribed steering angle $\theta$th may be set to a steering angle at which a step difference of the reaction torque generated before and after the switching of the second characteristic is allowable from the viewpoint of drivability. According to such a reaction torque adjustment process, it is possible to effectively suppress a sudden change in the reaction torque at the steering limit angle.

1-4. Processing Example by Steering Control System

Figure 8:
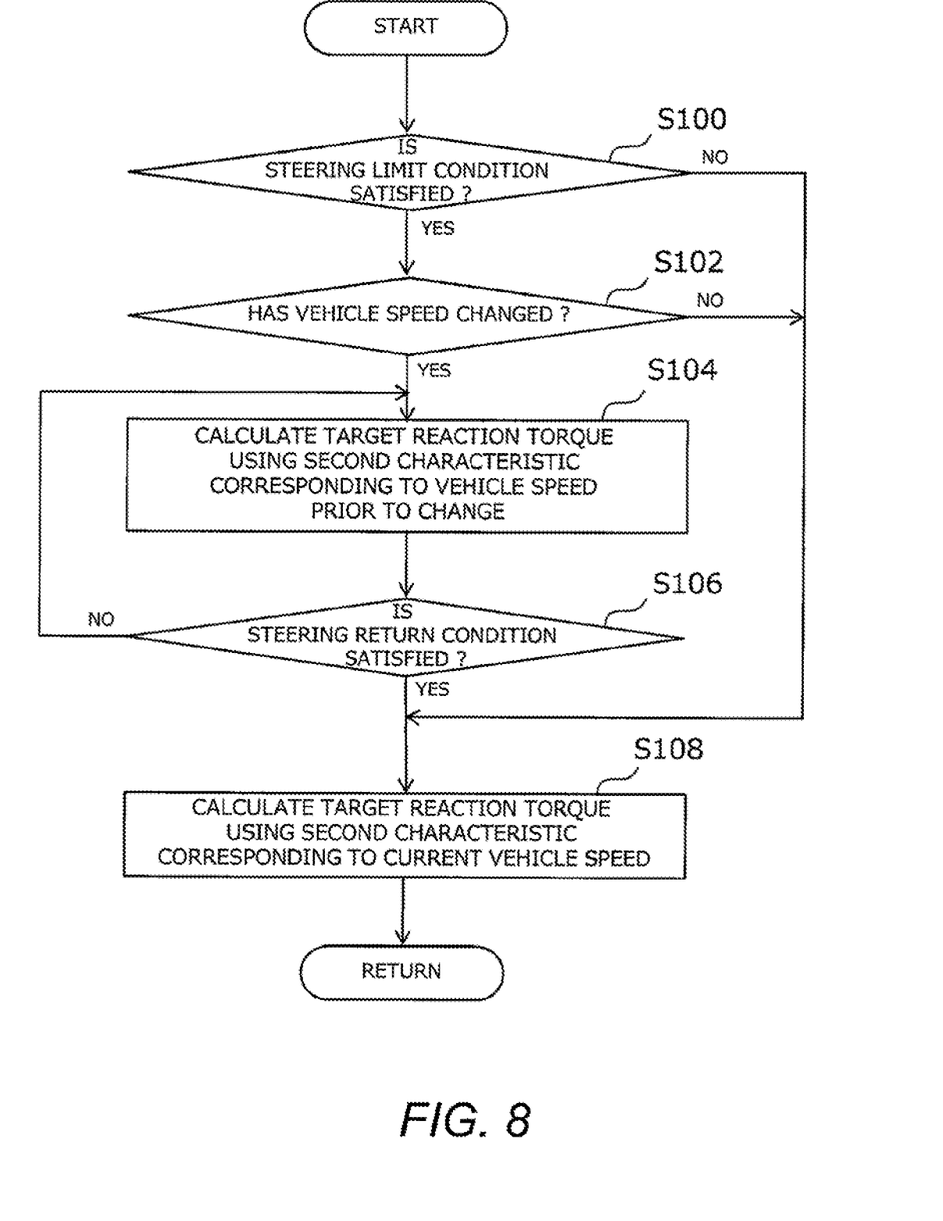
FIG. 8 is a flowchart showing an outline of processing by the steering control system according to the first embodiment.

FIG. 8 is a flowchart showing an outline of processing by the steering control system according to the first embodiment. The process shown in FIG. 8 is repeatedly executed in the reaction torque calculation unit 130 of the controller 100 at every predetermined cycle.

In the process of the step S100 shown in FIG. 8, it is determined whether the "steering limit condition" is satisfied. The steering limit condition is a condition for determining whether the steering angle reaches the steering limit. The steering limit condition may be determined by, for example, whether the steering angle $\theta$ detected by the steering angle sensor 51 reaches the steering limit $\theta$max in the current vehicle state (i.e., in the current vehicle speed). If it is determined that the steering limit condition is not satisfied, the process proceeds to step S108 described later. On the other hand, when the steering limit condition is satisfied, the process proceeds to the following step S102.

In the process of step S102, it is determined whether the vehicle speed has changed. As a result, when the vehicle speed has not changed, the process proceeds to the process of step S108 described later. On the other hand, when the vehicle speed changes, the process proceeds to the subsequent step S104.

In the process of step S104, the target reaction torque TRt corresponding to the input steering angle $\theta$ is calculated using the second characteristic corresponding to the vehicle speed prior to the change. In the process of the following step S106, it is determined whether the "steering return condition" is satisfied. The steering return condition is a condition determined by whether the steering angle $\theta$ has been returned to a predetermined steering angle $\theta$th or less. As a result, when the steering return condition is not satisfied, the process returns to the step S104 and the reaction torque is calculated. On the other hand, when it is confirmed that the steering return condition is satisfied, the process proceeds to the subsequent step S108.

In the process of step S108, the target reaction torque TRt corresponding to the input steering angle θ is calculated using the second characteristic corresponding to the current vehicle speed V. When the process of step S108 is completed, the present routine is terminated.

As described above, according to the reaction torque adjustment process shown in FIG. 8, it is possible to suppress a sudden change in the reaction torque, which becomes a problem when the vehicle speed changes at the steering limit. As a result, the steering wheel may be prevented from being moved abruptly, so that a sense of discomfort of the driver may be reduced.

1-5. Modified Examples

The steering control system 1 according to the first embodiment may be modified as described below.

The reaction torque adjustment process is not limited to the case of a change in the vehicle speed at the steering limit, and may be applied to other cases where the state of the vehicle changes. For example, the reaction torque adjustment process may be executed when the yaw rate or the lateral acceleration of the vehicle changes at the steering limit. In this case, the first characteristic and the second characteristic may be determined for each state (yaw rate, lateral acceleration) of the vehicle. The configuration of this modified example may also be applied to the steering control system of the second embodiment, which will be described later.

The reaction torque adjustment process may be applied not only to the case where the change in the vehicle speed at the steering limit is acceleration but also to the case where the vehicle speed is deceleration. In this case, it may be suppressed that the reaction torque suddenly increases at the steering limit and the steering 10 is turned back. The configuration of this modified example may also be applied to the steering control system of the second embodiment, which will be described later.

2. Second Embodiment 2-1. Features of Second Embodiment

The steering control system of the second embodiment is characterized in that, when the vehicle speed changes (e.g., accelerates) from the vehicle speed A to the vehicle speed B (e.g., vehicle speed B>vehicle speed A) at the steering limit, the reaction torque adjustment process is performed to gradually reduce the reaction torque. The configuration of the steering control system of the second embodiment is the same as that of the steering control system 1 of the first embodiment. The basic idea of the turning angle control and the reaction torque control is the same as that of the first embodiment. Description overlapping with that of the first embodiment will be omitted as appropriate.

Figure 9:
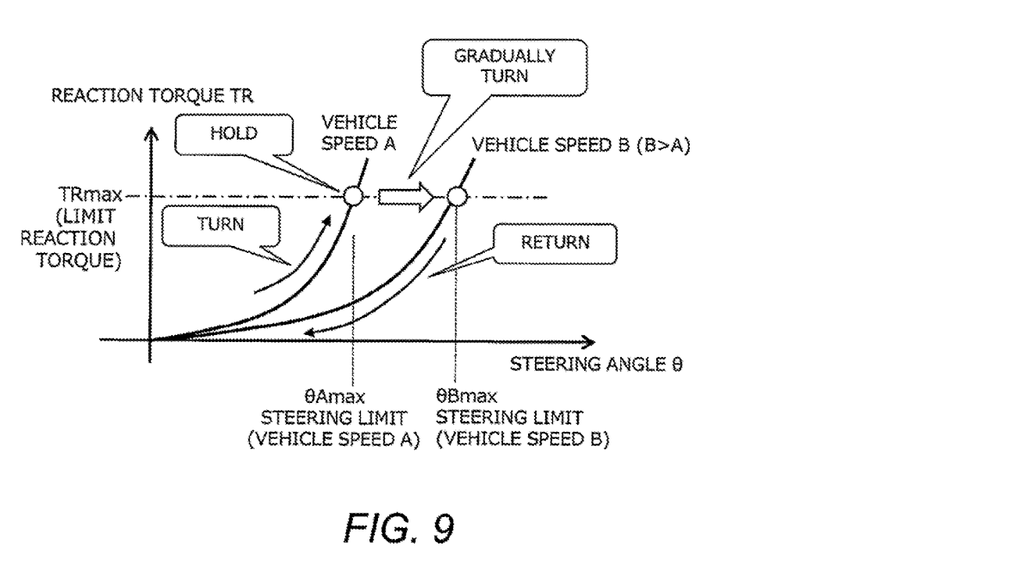
FIG. 9 is a diagram for explaining the reaction torque adjustment process according to a second embodiment.
Figure 10:
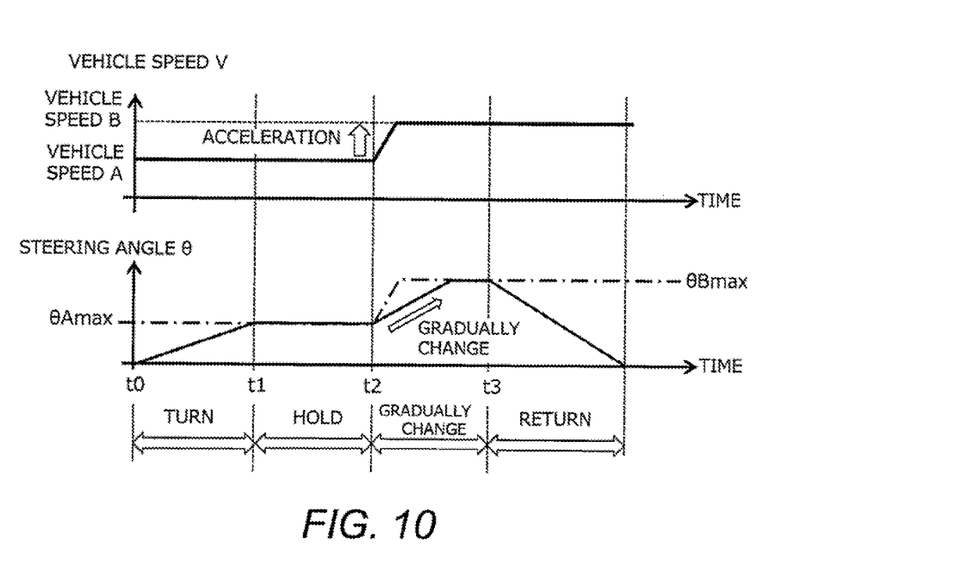
FIG. 10 is a time chart showing changes in the vehicle speed and the steering angle in the reaction torque adjustment process according to the second embodiment.

FIG. 9 is a diagram for explaining the reaction torque adjustment process according to the second embodiment. FIG. 10 is a time chart showing changes in the vehicle speed and the steering angle in the reaction torque adjustment process according to the second embodiment. The reaction torque adjustment process executed in the steering control system of the second embodiment is executed in the reaction torque calculation unit 130 of the controller 100. In the example shown in FIGS. 9 and 10, the vehicle traveling at the vehicle speed A as the first condition is accelerated at the time t2, and then travels at the vehicle speed B as the second state. First, when the steering of the steering wheel 10 is started at time t0, the steering is turned to the steering limit θAmax at the vehicle speed A at time t1, and thereafter, the steering is held until time t2. During the period from time t0 to time t2, the reaction torque calculation unit 130 calculates the reaction torque TR corresponding to the input steering angle θ using the second characteristic corresponding to the vehicle speed A.

On the other hand, when the vehicle speed changes from the vehicle speed A to the vehicle speed B in a condition where the steering angle θ is steered to the steering limit θAmax at the time t2, the reaction torque calculation unit 130 changes the vehicle speed used for calculation of the reaction torque more slowly than the change speed from the actual vehicle speed A to the actual vehicle speed B. For example, the reaction torque calculation unit 130 performs a predetermined smoothing process on the change from the vehicle speed A to the vehicle speed B, thereby making the change in the vehicle speed used in the calculation slower than the actual change in the speed. In addition, the reaction torque calculation unit 130 may guard the speed of change from the vehicle speed A to the vehicle speed B with a predetermined upper limit value, thereby making the change in the vehicle speed used for the calculation slower than the actual speed change. This makes it possible to naturally turn the steering angle from θAmax to θBmax while suppressing a sudden change in the calculated reaction torque, thereby reducing the sense of discomfort of the driver.

Thereafter, when the steering 10 starts to be turned back at time t3, the reaction torque calculation unit 130 calculates the reaction torque TR corresponding to the input steering angle θ using the second characteristic corresponding to the vehicle speed B. According to such a reaction torque adjustment process, it is possible to effectively suppress a sudden change in the reaction torque at the steering limit.

2-2. Processing Example by Steering Control System

Figure 11:
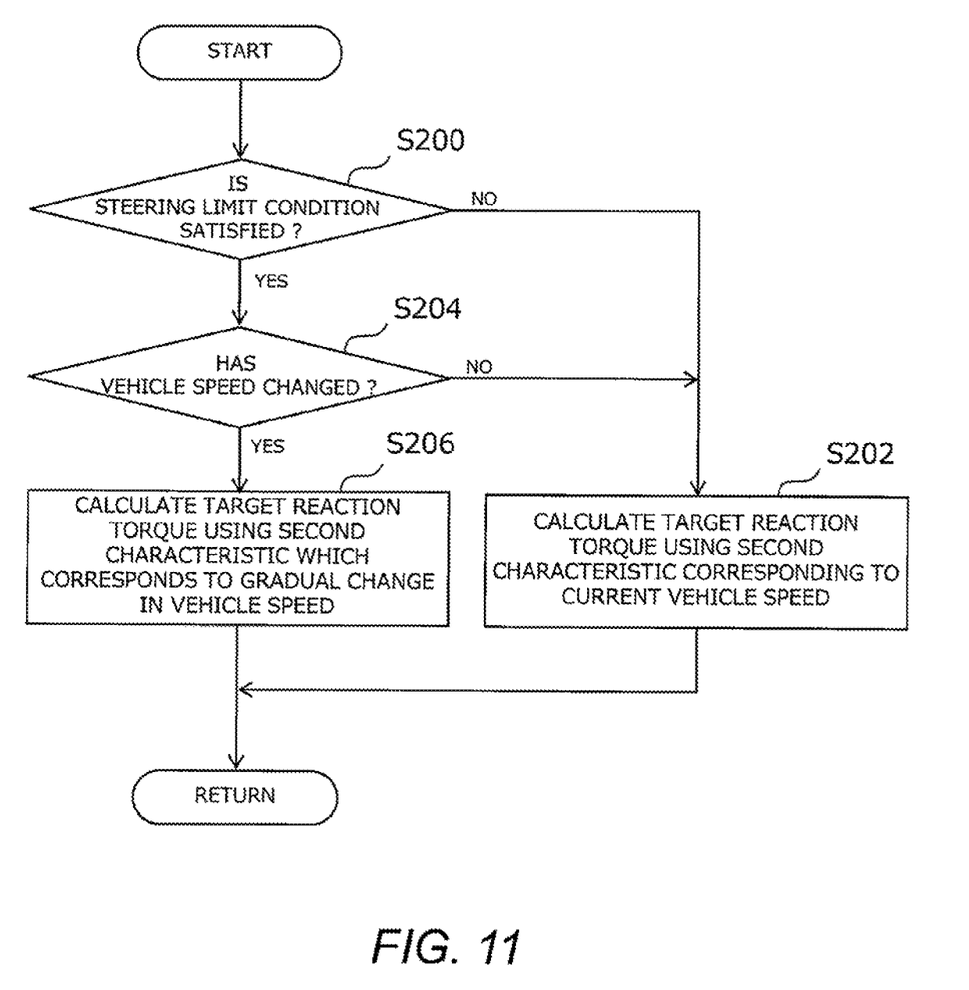
FIG. 11 is a flowchart showing an outline of processing by the steering control system according to the second embodiment.

FIG. 11 is a flowchart showing an outline of processing by the steering control system according to the second embodiment. The process shown in FIG. 11 is repeatedly executed in the reaction torque calculation unit 130 of the controller 100 at every predetermined cycle.

In the process of the step S200 shown in FIG. 11, it is determined whether the "steering limit condition" is satisfied. Here, the same process as the above-described step S100 is performed. If it is determined that the steering limit condition is not satisfied, the process proceeds to step S202. On the other hand, when the steering limit condition is satisfied, the process proceeds to step S204.

In the process of the step S202, similarly to the process of the step S108, the reaction torque calculation processing using the second characteristic corresponding to the vehicle speed is executed. When the process of step S202 is completed, the present routine is terminated.

In the process of step S204, it is determined whether the vehicle speed has changed. As a result, when the vehicle speed has not changed, the process proceeds to the above-described step S202. On the other hand, when the vehicle speed changes, the process proceeds to the process of the following step S206.

In the process of step S206, the target reaction torque TRt corresponding to the input steering angle θ is calculated while gradually changing the second characteristic from the characteristic corresponding to the vehicle speed prior to the change to the characteristic corresponding to the current vehicle speed. When the process of step S206 is completed, the present routine is terminated.

As described above, according to the reaction torque adjustment process shown in FIG. 11, it is possible to suppress a sudden change in the reaction torque, which becomes a problem when the vehicle speed changes at the steering limit. As a result, the steering wheel can be prevented from being moved abruptly, so that a sense of discomfort of the driver can be reduced.

What is claimed is:

1. A steering control system for a steer-by-wire vehicle, the steering control system comprising:
a steering motor for turning wheels of the vehicle;
a reaction force motor for applying a reaction torque to a steering of the vehicle; and
a controller for calculating a turning angle of the wheels for controlling the steering motor and a reaction torque for controlling the reaction force motor based on a state of the vehicle,
wherein the controller is configured to:
calculate the turning angle according to the steering angle based on a first characteristic representing a relationship of a magnitude of the turning angle to the steering angle of the steering; and
calculate the reaction torque according to the steering angle based on a second characteristic representing a relationship of a magnitude of the reaction torque to the steering angle,
wherein the first characteristic and the second characteristic are configured to be adjustable according to the state of the vehicle,
wherein the controller is configured to change the first characteristic from a characteristic corresponding to a first state to a characteristic corresponding to a second state in response to a change in the state of the vehicle from the first state to the second state, and
wherein the controller is configured to maintain the second characteristic at the characteristic corresponding to the first state when the state of the vehicle changes from the first state to the second state in the case where the steering angle is steered to a steering limit corresponding to an upper limit of the turning angle.

2. The steering control system according to claim 1, wherein the controller is configured to, when the steering angle is returned to a predetermined steering angle in a third state after the state of the vehicle is changed from the first state to the second state at the steering limit, change the second characteristic from the characteristic corresponding to the first state to the characteristic corresponding to the third state.

3. The steering control system according to claim 1, wherein the state of the vehicle includes a vehicle speed, wherein the second state has a higher vehicle speed than the first state, and
wherein when the state of the vehicle changes from the first state to the second state at the steering limit, the controller is configured to change the first characteristic so that the magnitude of the turning angle with respect to the steering angle decreases.

4. The steering control system according to claim 1, wherein the state of the vehicle includes a vehicle speed, wherein the second state has a lower vehicle speed than the first state, and
wherein when the state of the vehicle changes from the first state to the second state at the steering limit, the controller is configured to change the first characteristic so that the magnitude of the turning angle with respect to the steering angle increases.

5. A steering control system for a steer-by-wire vehicle, the steering control system comprising:
a steering motor for turning wheels of the vehicle;
a reaction force motor for applying a reaction torque to a steering of the vehicle; and
a controller for calculating a turning angle of the wheels for controlling the steering motor and a reaction torque for controlling the reaction force motor based on a state of the vehicle,
wherein the controller is configured to:
calculate the turning angle according to the steering angle based on a first characteristic representing a relationship of a magnitude of the turning angle to the steering angle of the steering; and
calculate the reaction torque according to the steering angle based on a second characteristic representing a relationship of a magnitude of the reaction torque to the steering angle,
wherein the first characteristic and the second characteristic are configured to be adjustable according to the state of the vehicle,
wherein the controller is configured to change the first characteristic from a characteristic corresponding to a first state to a characteristic corresponding to a second state in response to a change in the state of the vehicle from the first state to the second state, and
wherein the controller is configured to, when the steering angle is steered to a steering limit corresponding to an upper limit of the turning angle and the state of the vehicle changes from the first state to the second state, change the second characteristic from the characteristic corresponding to the first state to the characteristic corresponding to the second state at a change speed slower than a change speed of the state of the vehicle.

6. The steering control system according to claim 5, wherein the state of the vehicle includes a vehicle speed, wherein the second state has a higher vehicle speed than the first state, and
wherein when the state of the vehicle changes from the first state to the second state at the steering limit, the controller is configured to change the first characteristic so that the magnitude of the turning angle with respect to the steering angle decreases.

7. The steering control system according to claim 5, wherein the state of the vehicle includes a vehicle speed, wherein the second state has a lower vehicle speed than the first state, and
wherein when the state of the vehicle changes from the first state to the second state at the steering limit, the controller is configured to change the first characteristic so that the magnitude of the turning angle with respect to the steering angle increases.

* * * * *